US007010193B1

(12) United States Patent
Deng et al.

(10) Patent No.: US 7,010,193 B1
(45) Date of Patent: Mar. 7, 2006

(54) ADJUSTABLE OPTICAL SIGNAL COLLIMATOR

(75) Inventors: Qi Deng, Cupertino, CA (US); Xiwen Wang, Coram, NY (US); Liren Du, San Jose, CA (US); Shuqing Ma, Sunnyvale, CA (US); Yonglin Huang, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 92 days.

(21) Appl. No.: 10/697,549

(22) Filed: Oct. 30, 2003

Related U.S. Application Data

(60) Provisional application No. 60/422,209, filed on Oct. 30, 2002.

(51) Int. Cl.
*G02B 6/32* (2006.01)

(52) U.S. Cl. .......................................... 385/33; 385/25

(58) Field of Classification Search ............ 385/33–35, 385/25, 73, 74; 359/822, 823, 826
See application file for complete search history.

(56) References Cited

U.S. PATENT DOCUMENTS 4,265,511 A * 5/1981 Nicia et al. ................... 385/74
4,730,891 A * 3/1988 Poorman ..................... 385/74
4,989,940 A * 2/1991 Wollenweber et al. ........ 385/35
5,095,517 A * 3/1992 Monguzzi et al. ............ 385/90
5,801,892 A * 9/1998 Naganuma et al. ......... 359/892
6,343,166 B1 * 1/2002 Hellman et al. .............. 385/31
6,400,867 B1 * 6/2002 Liu ............................. 385/33
6,430,337 B1 * 8/2002 Bergmann et al. ............ 385/25
6,621,954 B1 * 9/2003 Xie et al. ..................... 385/33
2003/0185519 A1 * 10/2003 Ushinsky ..................... 385/72

* cited by examiner

*Primary Examiner*—Rodney Bovernick
*Assistant Examiner*—Mike Stahl
(74) *Attorney, Agent, or Firm*—Workman Nydegger

(57) ABSTRACT

A collimating device having adjustable features that facilitate proper optical alignment of components positioned within the collimator is disclosed. In one embodiment, the collimating device includes a collimating portion including a collimating element, a core portion containing an optical device, and at least one adapter portion. An engagement surface on one end of the collimating portion is shaped to engage a corresponding engagement surface on one end of the adapter portion to form an adjustment point. An additional adjustment point is defined between another end of the adapter portion and an end of the core portion. These adjustment points enable the collimating portion to be maneuvered with respect to the core portion in order to align the collimating device. Minimal clearances between the adjustment point surfaces minimize the amount of adhesive needed to bond the collimator portion together after alignment, thereby producing a more stable and secure collimating device.

33 Claims, 7 Drawing Sheets

ADJUSTABLE OPTICAL SIGNAL COLLIMATOR

CROSS-REFERENCE TO RELATED APPLICATIONS

This application claims the benefit of U.S. Provisional Application No. 60/422,209, filed Oct. 30, 2002, which is incorporated herein by reference in its entirety.

BACKGROUND OF THE INVENTION

1. The Field of the Invention

The present invention generally relates to optical collimating devices. In particular, the present invention relates to an optical collimator having adjustable features that improves the bonding and alignment of collimator components.

2. The Related Technology

Collimating devices are prevalent in modern optical communications systems. Collimating devices, which re-direct diverging and converging optical beams into parallel beams, are employed in a variety of optical apparatus, including optical filters, optical isolators, optical circulators, etc.

Typical collimators include a hollow cylindrical tube having a collimating element positioned within either end of the tube, and an optical component interposed in the tube between the collimating elements. A specified amount of clearance is typically defined between the surface of each collimating element and the tube inner surface to enable collimating element placement within the tube to occur. The amount of clearance that is defined between the surfaces of the collimating elements and the tube is typically relatively large to enable the collimating elements to be properly aligned within the tube. After placement and alignment, the collimating elements are bonded in place with epoxy or other suitable adhesive.

The above configuration for placement and bonding of collimating elements in known collimators brings with it certain challenges. Among these challenges is the fact that excessive amounts of adhesive must be used to bridge the relatively large gap between the tube and the collimating elements. This profusion of adhesive can subsequently lead to shrinkage and deformation of the adhesive over time, which can correspondingly create misalignment of the collimating elements within the tube. Such problems can eventually lead to performance reductions or even interruptions in the operation of optical components that are positioned with the collimating elements within the collimator.

In light of the above, a need exists in the art for a collimating device that overcomes the above challenges. In particular, a collimating device is needed that allows for the accurate alignment and bonding of collimating elements and other components positioned in the collimating device, while avoiding the problems associated with known collimating device designs.

BRIEF SUMMARY OF THE INVENTION

The present invention has been developed in response to the above and other needs in the art. Briefly summarized, embodiments of the present invention are directed to an adjustable collimating device for use in optical communications. The present collimating device is configured to allow for adjustment of collimating elements positioned within the collimating device while minimizing gaps between bonding areas that are used to secure the collimating device. Once proper alignment is achieved, the collimating device is secured at the bonding area to form a stable configuration that preserves the stability of the system.

In one embodiment, the adjustable collimating device generally includes a collimating portion a core portion, and an adapter portion. Each of these portions defines a segment of a longitudinal cavity that extends through the collimating device, through which optical beams can pass. The collimating portion includes in its longitudinal cavity segment an optical fiber for inputting optical beams, and a collimating element. A first end of the collimating portion includes a first engagement surface that is shaped to enable adjustment of the collimating portion.

The core portion includes an optical component, such as a filter device, birefringent crystal, or optical isolator, in its cavity segment. The core portion also includes a reduced diameter second end that fits within a first end of the adapter portion. The second end of the adapter portion includes a second engagement surface that is shaped to engage with the first engagement surface of the collimating portion.

Embodiments of the adjustable collimating device described herein include various adjustment points that enable adjustment of the various portions of the device with respect to one another. In particular, the first and second engagement surfaces of the collimating portion and adapter portion, respectively, have corresponding shaped surfaces. In one embodiment, for example, the first engagement surface is convexly shaped, while the second engagement surface has a concave surface. These correspondingly shaped engagement surfaces form a first adjustment point that enables angular, articular deviation to occur between the collimating portion and the core portion via the adapter portion. Thereby facilitating the alignment of the optical fiber and collimating element with the optical component of the core portion. Further, the reduced diameter second end of the core portion is configured to slide axially within the first end of the adapter portion to form a second adjustment point, thereby enabling axial movement of the core portion with respect to the collimating portion.

The adjustable points described above enable the collimating portion to be properly aligned with respect to the core portion such that optical beams are able to pass through the collimating device and be manipulated as intended. After proper alignment is achieved, the collimating portion, adapter portion, and core portion are bonded one with another using a suitable adhesive to form a rigid device. The bonding occurs at the adjustment points, which are configured to minimize any gaps between the collimating device portions. Thus, stability of the collimating device and the optical components positioned therein is increased and proper optical alignment is maintained.

In other embodiments, the collimating device includes varying configurations that provide additional or different adjustment points for increased directional adjustment freedom for the collimating device during optical alignment procedures. In yet other embodiments, the collimating device includes a core portion having adapter portions and collimating portions on either end of the core portion.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–5 depict various features of embodiments of the present invention, which is generally directed to an adjustable collimating device for use in optical communications devices and networks. The present adjustable collimating device enables simpler optical alignment procedures to be performed. Further, the adjustable collimating devices provides reduced gap bonding areas after alignment is complete, thereby resulting in a more stable and secure union between components in the adjustable collimating device.

Reference is first made to FIGS. 1A–1D, which depict one embodiment of an adjustable collimating device ("collimator"), generally designated at 10. As used herein, the collimator 10 is generally considered to be a device that can perform optical beam collimating alone, or can integrate collimating functions with other optical functions that are performed by components positioned within the collimator, as will be seen.

Figure 1B:
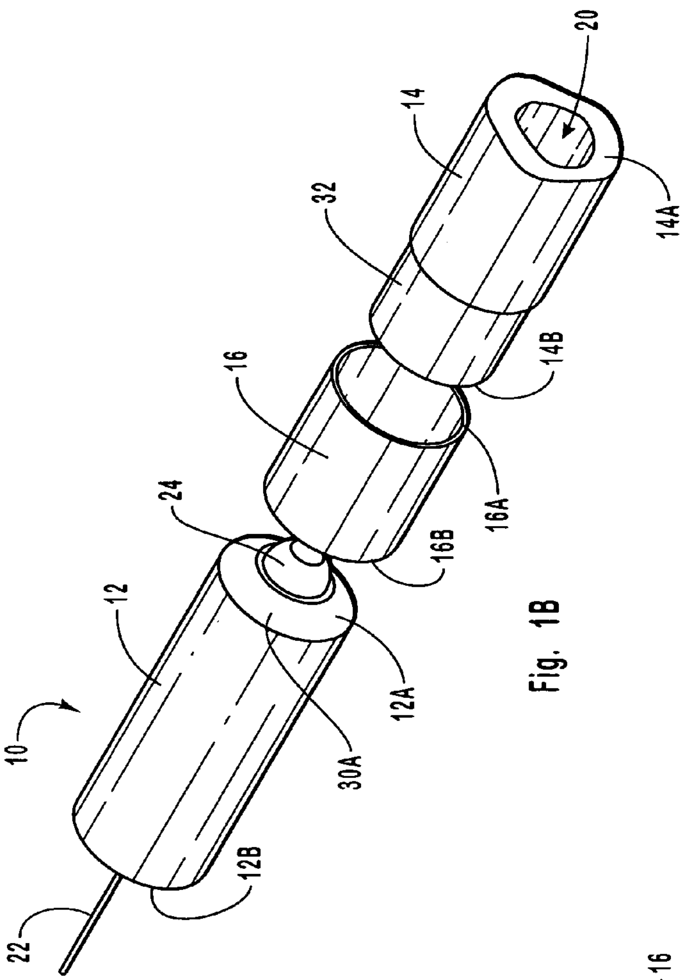
FIG. 1B is an exploded perspective view of the adjustable collimating device of FIG. 1A.
Figure 1A:
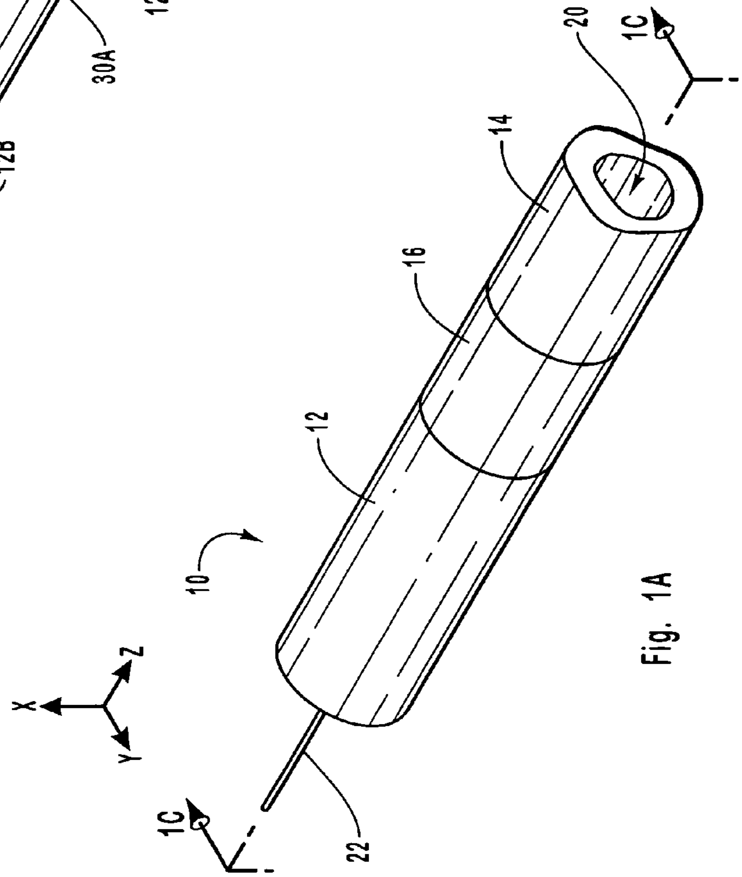
FIG. 1A is a perspective view of an adjustable collimating device according to one embodiment of the present invention.
Figure 1D:
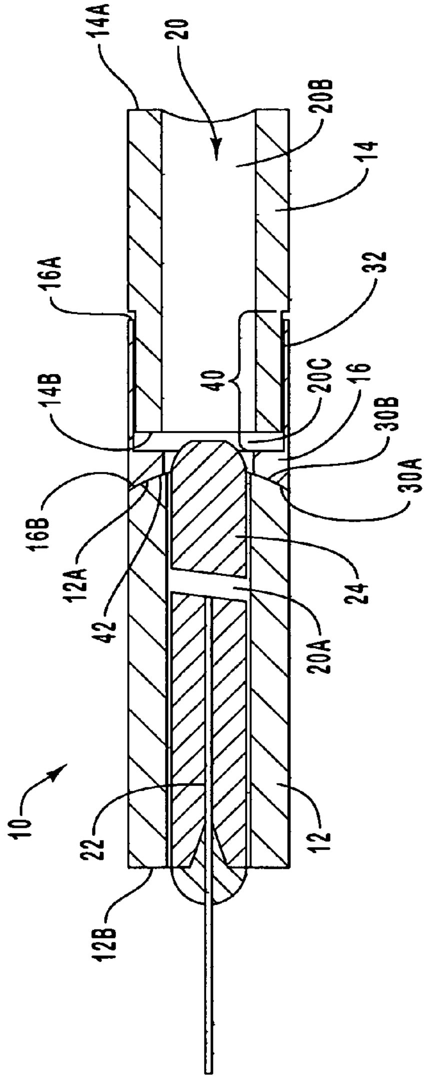
FIG. 1D is a cross sectional side view of the adjustable collimating device of FIG. 1C.
Figure 1C:
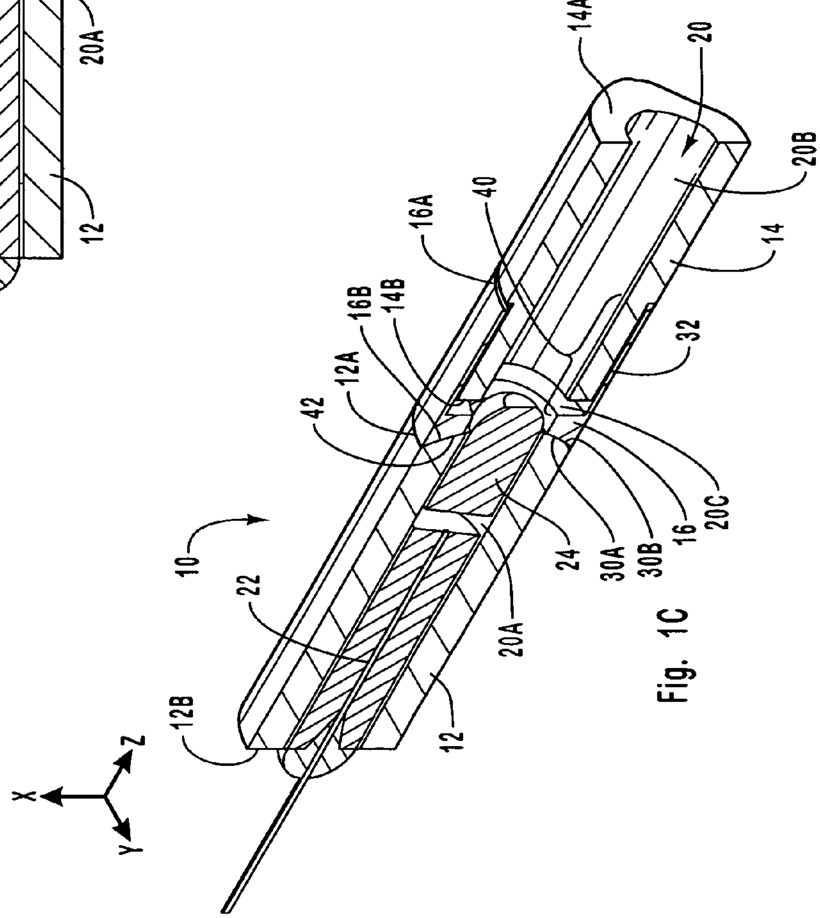
FIG. 1C is a cross sectional perspective view of the adjustable collimating device of FIG. 1A taken along the lines 1C—1C.
Figure 2B:
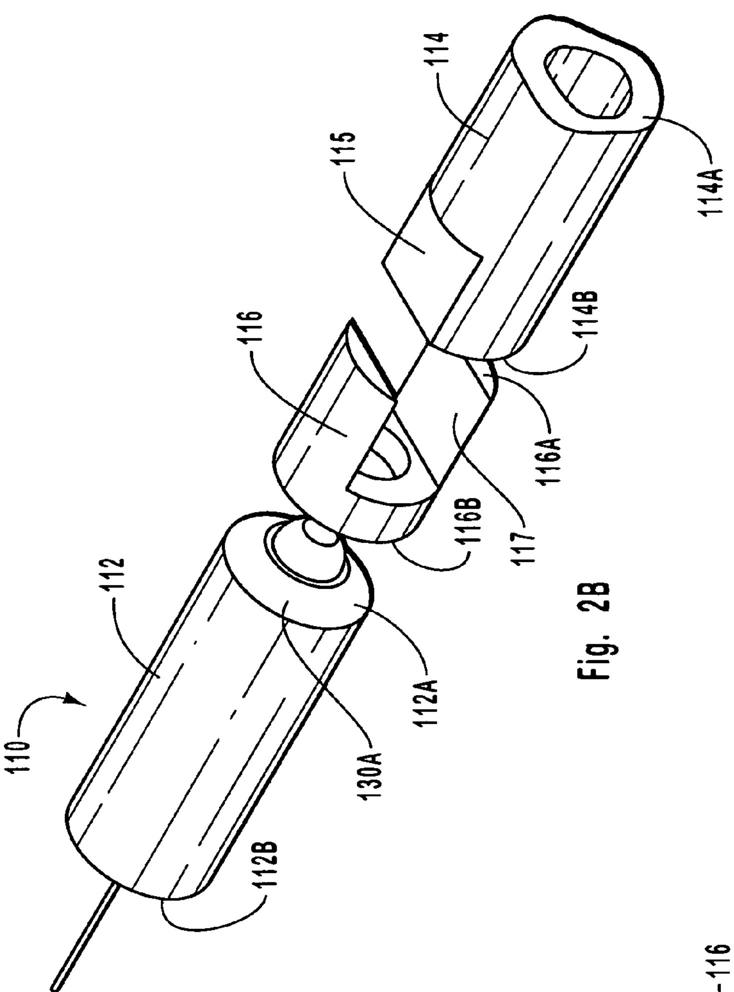
FIG. 2B is an exploded perspective view of the adjustable collimating device of FIG. 2A.
Figure 2A:
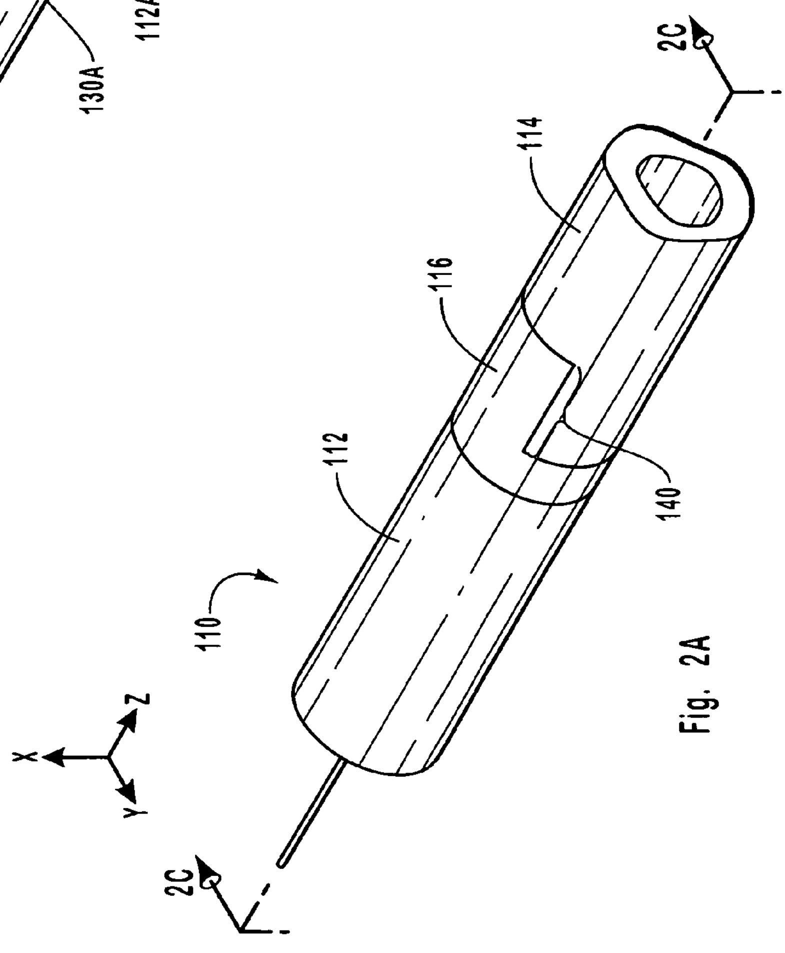
FIG. 2A is a perspective view of an adjustable collimating device according to another embodiment of the present invention.
Figure 2D:
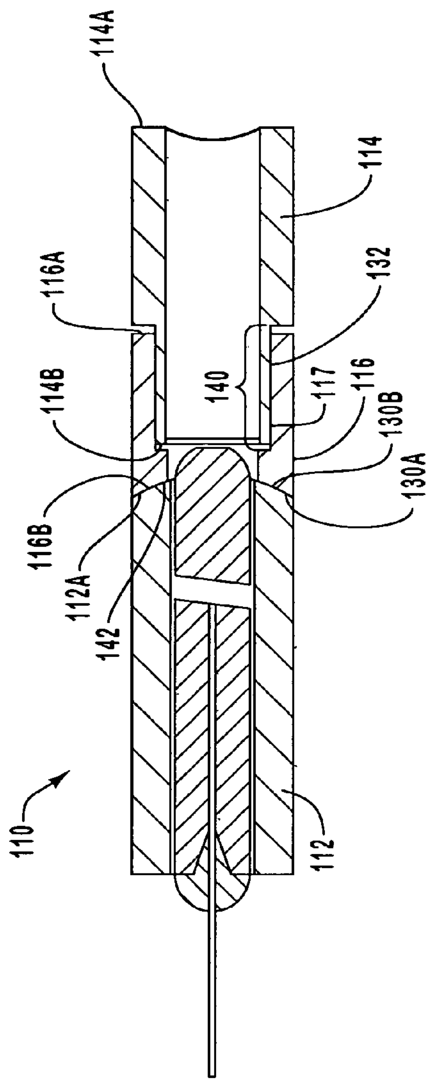
FIG. 2D is a cross sectional side view of the adjustable collimating device of FIG. 2C.
Figure 2C:
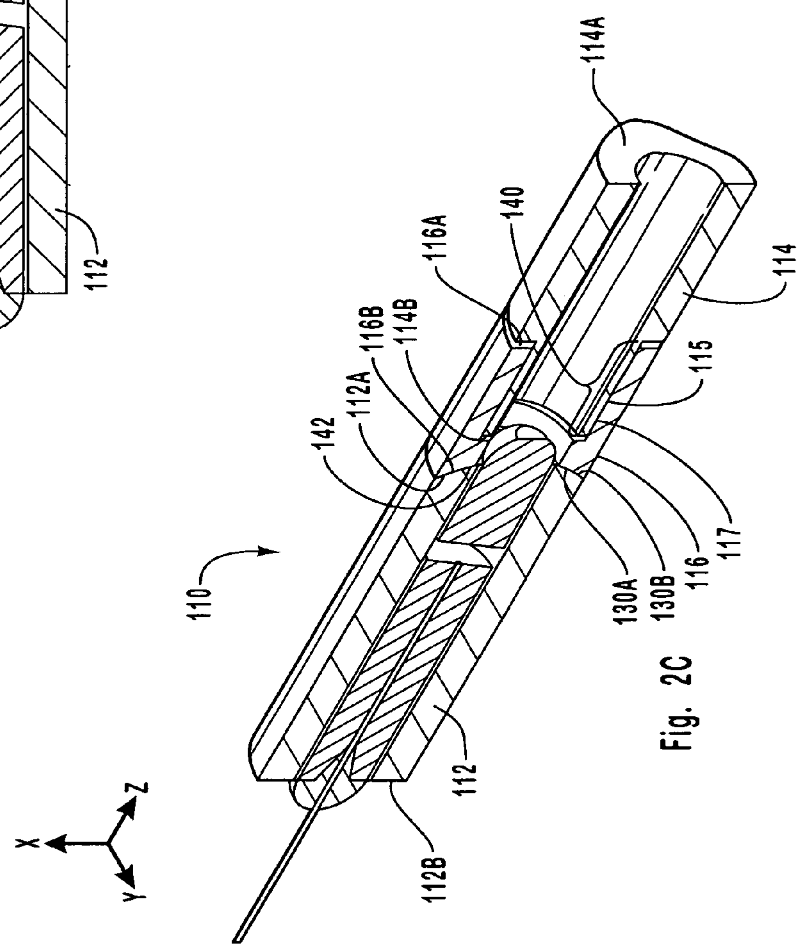
FIG. 2C is a cross sectional perspective view of the adjustable collimating device of FIG. 2A taken along the lines 2C—2C.
Figure 3B:
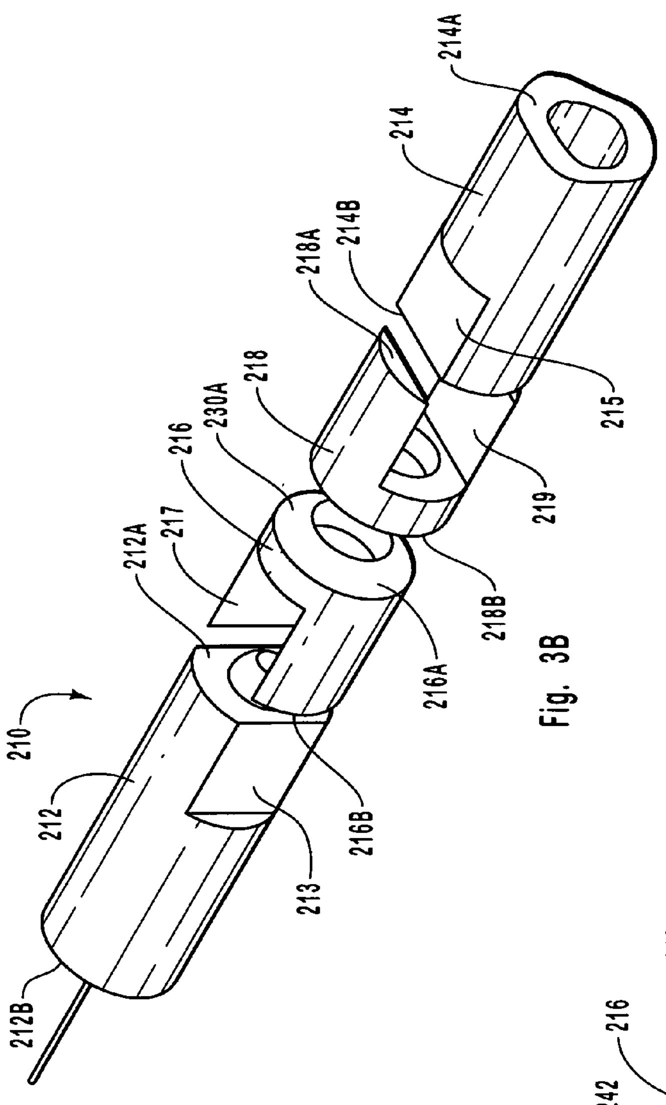
FIG. 3B is an exploded perspective view of the adjustable collimating device of FIG. 3A.
Figure 3A:
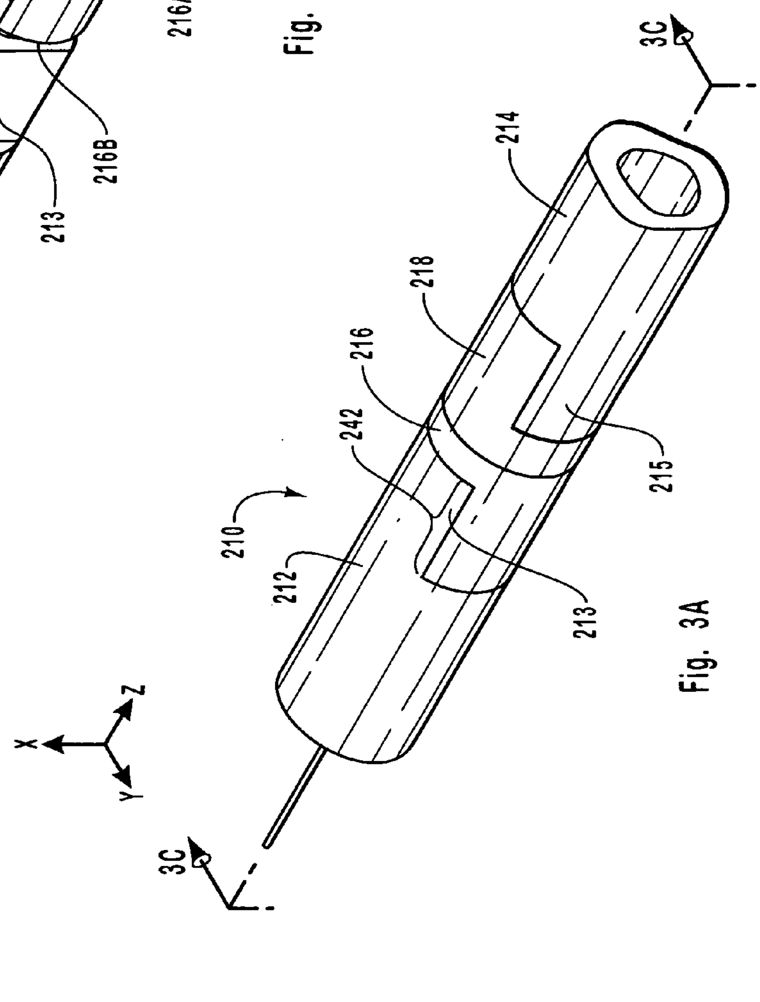
FIG. 3A is a perspective view of an adjustable collimating device according to another embodiment of the present invention.
Figure 3D:
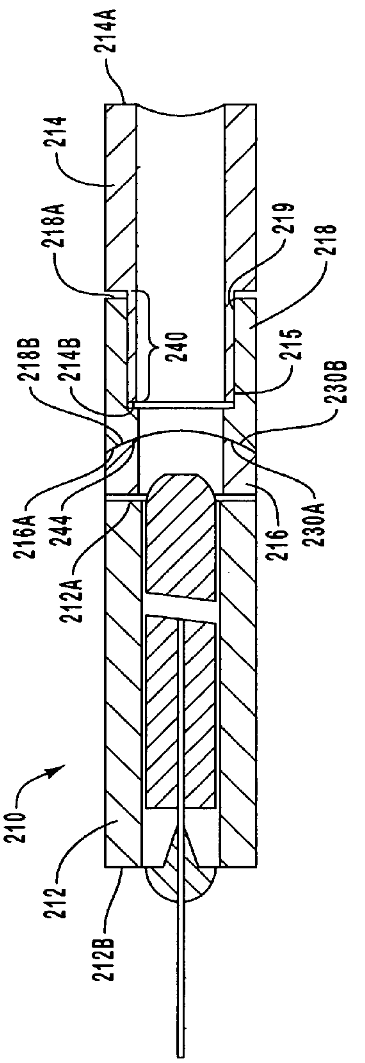
FIG. 3D is a cross sectional side view of the adjustable collimating device of FIG. 3C.
Figure 3C:
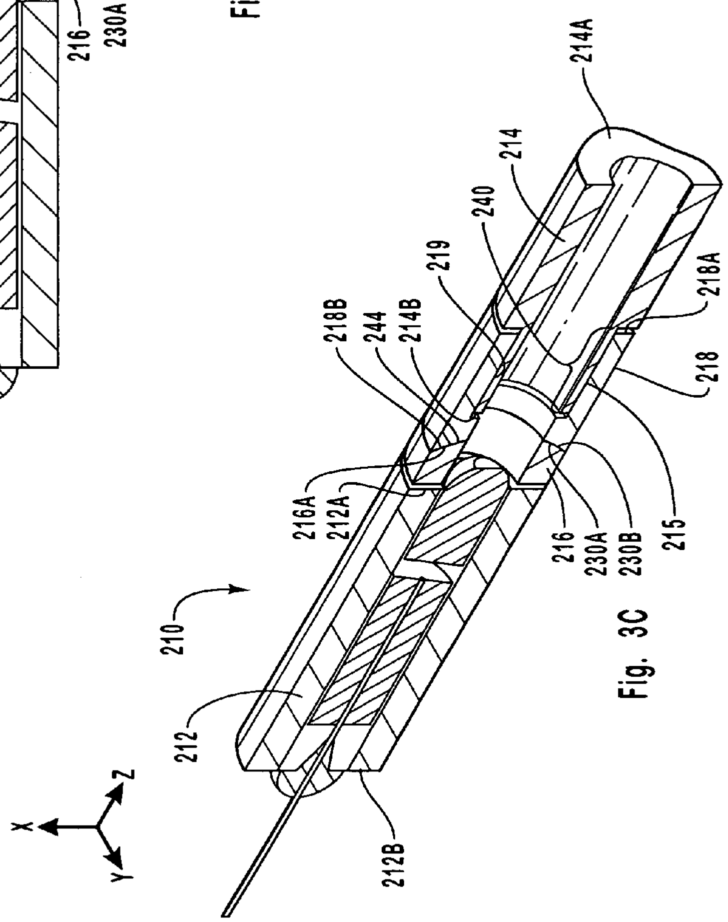
FIG. 3C is a cross sectional perspective view of the adjustable collimating device of FIG. 3A taken along the lines 3C—3C.

As seen in FIGS. 1A–1D, the collimator 10 has a generally cylindrical shape extending longitudinally in a Z-axis direction. The collimator 10 includes various components according to the present embodiment, including a collimating portion 12, a core portion 14, and an adapter portion 16. Each of these components cooperates to define a longitudinal cavity 20 extending through a central length of the collimator 10 along the Z-axis, as shown in FIG. 1A. Though not explicitly depicted in the accompanying figures, the collimator 10 can include a similar structure on either side of the core portion 14. For purposes of illustration, however, FIGS. 1A–1D show the structure of the collimator 10 from the perspective of half of the core portion 14.

The collimating portion 12 includes a first end 12A and a second end 12B between which extends a cavity portion 20A of the longitudinal cavity 20. The cavity portion 20A contains various components, including an optical fiber 22 that is optically coupled to a collimating element, such as a lens 24. In one embodiment, the lens 24 includes a graded index lens or aspherical lens, though other types of collimating lenses or elements are possible. The lens 24 in the illustrated embodiment extends a short distance from the first end 12A.

In detail, the first end 12A of the collimating portion 12 includes an annular surface that forms a first engagement surface 30A for engaging with the adapter portion 16. The first engagement surface 30A here is convexly shaped about its annular surface, though other shaping can alternatively be employed.

The core portion 14 includes a first end 14A and a second end 14B between which extends a cavity portion 20B of the longitudinal cavity 20. The cavity portion 20B can contain one or more optical components (not shown), such as an optical isolator, filter, or circulator, for example. As already mentioned, the first end 14A of the core portion as shown in FIGS. 1A–1D can be coupled to or part of an additional segment of the core portion, which is not shown. The second end 14B includes a reduced diameter 32 that forms a mating surface that is received by the adapter portion 16.

The adapter portion 16, which can be made from steel or other suitable material, includes a first end 16A and a second end 16B between which extends a cavity segment 20C of the longitudinal cavity 20. The first end 16A is sized to receive therein the mating surface formed by the reduced diameter 32 of the core portion second end 14B. In the illustrated embodiment, the lens 24 of the collimating portion 12 is partially received into the cavity segment 20C of the adapter portion 16 at the second end 16B. The second end 16B further includes an annular surface that forms a second engagement surface 30B for engaging with the first engagement portion 30A of the collimating portion 12. The second engagement surface 30B here is concavely shaped about its annular surface, though other shaping can alternatively be employed.

As mentioned, the present collimator 10 enables adjustment of the various components thereof to occur before they are bonded in a fixed position with respect to one another, thereby facilitating enhanced optical alignment of the collimator. In detail, the collimator 10 shown in FIGS. 1A–1D includes two adjustment points. First, proximity of the mating surface formed by the reduced diameter 32 of the core portion second end 14B with the first end 16A of the adapter portion 16 forms a first adjustment point 40 that enables axial movement of the core portion 14 along the Z-axis with respect to the adapter portion 16, and hence the collimating portion 12.

Second, the engagement between the first and second engagement surfaces 30A and 30B forms a second adjustment point 42, resembling an articular or ball-joint configuration that enables articular movement of the collimating portion 12 about the three axes X, Y, and Z with respect to the adapter portion 16, and hence the core portion 14. Thus, use of the first and second adjustment points 40 and 42 allows for proper optical alignment of the collimating portion 12 with respect to the core portion 14, thereby enabling in turn the various optical components contained in the longitudinal cavity 20 to be properly aligned. In one embodiment, for instance, alignment of the collimator 10 as above enables the optical fiber 22 and lens 24 to be aligned with an optical component, such as a filter element (not shown), located in the core portion 14.

After alignment is complete, the various portions of the collimator 10 are bonded in place to preserve the alignment. In accordance with embodiments of the present invention, collimator bonding is accomplished via the adjustment points 40 and 42. In particular, each of the adjustment points 40 and 42 are designed such that relatively small clearances exist between the components defining the adjustment points. Thus, the mating surface of the reduced diameter 32 and the adapter portion first end 16A, as well as the first and second engagement surfaces 30A and 30B, are configured with minimal spacing between the respective surfaces. This in turn enables a minimum of adhesive to be used in bonding the various portions to one another, which correspondingly reduces instability between the portions as a result of adhesive shrinkage and other complications that arise due to large amounts of adhesive that must be used in known collimator designs.

In this and other embodiments, one or more of a variety of adhesives or adhesive methods can be used to bond the collimator portions together. Epoxy, solder, and the use of laser welding techniques are merely a few examples of adhesives or adhesive methods that can be employed.

It is noted that, in other embodiments, various modifications can be made to the adjustment points while still residing within the claims of the present invention. For instance, the second end of the core portion, in contrast to the reduced diameter shown in FIG. 1, can be configured such that it receives a portion of the adapter portion. These and other modifications are therefore contemplated.

Reference is now made to FIGS. 2A–2D, which depict another embodiment of the present invention. It is noted that this and other embodiments to follow include features that are similar to those already described above in connection with FIGS. 1A–1D. As such, only selected features of the following embodiments will be discussed.

FIGS. 2A–2D depict a collimator, designated at 110, that generally includes a collimator portion 112, a core portion 114, and an adapter portion 116. The collimator portion 112 is configured similarly to the collimating portion 12 of the previous embodiment, including a convexly shaped first engagement surface 130A on a first end 112A thereof. The core portion 114 includes a first end 114A, and a second end 114B. Opposing portions of the core portion second end 114B are shaped to form a flattened tongue 115 for engagement with the adapter portion 116.

The adapter portion 116 includes a first end 116A having a slot 117 that extends inwardly from the first end. The adapter portion 116 also includes a second end 116B that defines a concavely shaped second engagement surface 130B, as in the previous embodiment.

The structure of the collimator 110 as described above enables adjustment of the various components thereof to occur before they are bonded in a fixed position with respect to one another, thereby facilitating enhanced optical alignment of the collimator. In detail, the collimator 110 shown in FIGS. 2A–2D includes two adjustment points that facilitate various modes of alignment. First, the tongue 115/slot 117 structure between the core portion 114 and adapter portion 116 forms a first adjustment point 140 that enables not only axial movement of the core portion 114 along the Z-axis with respect to the adapter portion 116, and hence the collimator portion 112, but also enables transverse movement of the core portion along the Y-axis with respect to the collimating portion.

Second, the engagement between the first and second engagement surfaces 130A and 130B forms a second adjustment point 142 that enables articular movement of the collimator portion 112 about the three axes X, Y, and Z with respect to the adapter portion 116, and hence the core portion 114, as in the previous embodiment.

Thus, the first and second adjustment points 140 and 142 allow for proper optical alignment of the collimator 110 to be performed. After the optical alignment is complete, the adjustment points 140 and 142, having minimized spacing between their respective contact surfaces, are used as bonding points to bond the various portions of the collimator 110 in place, as described above.

Reference is now made to FIGS. 3A–3D in describing various details regarding another embodiment of the present invention. It is noted that this embodiment includes features that are similar to those already described above in connection with FIGS. 1A–1D. As such, only selected features of the following embodiments will be discussed.

FIGS. 3A–3D depict a collimator, designated at 210, that generally includes a collimator portion 212, a core portion 214, a first adapter portion 216, and a second adapter portion 217. The collimator portion 212 includes first and second ends 212A and 212B, respectively. The first end 212A includes opposing portions that are shaped to form a flattened tongue 213 for engagement with the first adapter portion 216.

The core portion 214 includes a first end 214A and a second end 214B. Opposing portions of the core portion second end 214B are shaped to form a flattened tongue 215 for engagement with the second adapter portion 216.

The first adapter portion 216 includes a first end 216A and a second end 216B. The second end 216B includes a slot 217 that extends inwardly from the adapter portion second end for engagement with the tongue 213 of the collimator portion first end 212A. In addition, the first end 216A of the adapter portion 216 also defines an annular, convexly shaped first engagement surface 230A.

Correspondingly, the second adapter portion 218 includes a first end 218A and a second end 218B. The first end 218A includes a slot 219 that extends inwardly from the adapter portion first end for engagement with the tongue 215 of the core portion second end 214B. In addition, the second end 218B of the second adapter portion 218 also defines an annular, concavely shaped second engagement surface 230B.

The structure of the collimator 210 as described above enables adjustment of the various components thereof to occur before they are bonded in a fixed position with respect to one another, thereby facilitating enhanced optical alignment of the collimator. In detail, the collimator 210 shown in FIGS. 3A–3D includes three adjustment points that facilitate various modes of alignment. First, the tongue 215/slot 219 structure between the core portion 214 and the second adapter portion 218 forms a first adjustment point 240 that enables not only axial movement of the core portion 214 along the Z-axis with respect to the second adapter portion 218, and hence the collimator portion 212, but also enables transverse movement of the core portion along the Y-axis with respect to the collimating portion. In one embodiment, the engagement between the tongue 215 and slot 219 can also facilitate angular movement of the core portion 214 with respect to the collimating portion 212 about the X-axis, if desired.

Second, the tongue 213/slot 217 structure between the collimating portion 212 and the first adapter portion 216 forms a second adjustment point 242 (FIG. 3A) that enables both axial movement of the collimating portion 212 along the Z-axis with respect to the core portion 214, as well as transverse movement of the collimating portion along the X-axis with respect to the core portion. Thus, transverse and axial movement of the collimating portion 212 in relation to the core portion 214 is made possible via the first and second adjustment points 240 and 242. In one embodiment, the engagement between the tongue 213 and the slot 217 can also facilitate angular movement of the collimating portion 212 with respect to the core portion 214 about the Y-axis, if desired.

Third, the second engagement surface 230B of the second adapter portion 218 is shaped and positioned to movably engage with the first engagement surface 230A of the first adapter portion 216 to enable optical alignment of the collimator 210. This engagement forms a third adjustment point 244 that enables articular movement of the first adapter portion 216 about the three axes X, Y, and Z with respect to the second adapter portion 218, thereby enabling corresponding angular movement of the collimating portion 212 with respect to the core portion 214, as desired in previous embodiments.

Thus, the first, second, and third adjustment points 240, 242, and 244 allow for proper optical alignment of the collimator 210 to be performed in linear and angular directions along all three axes. After the optical alignment is complete the adjustment points 240, 242, and 244, which possess minimized spacing between their respective contact surfaces, are used as bonding points to bond the various portions of the collimator 210 in place, as described in previous embodiments.

Figure 4:
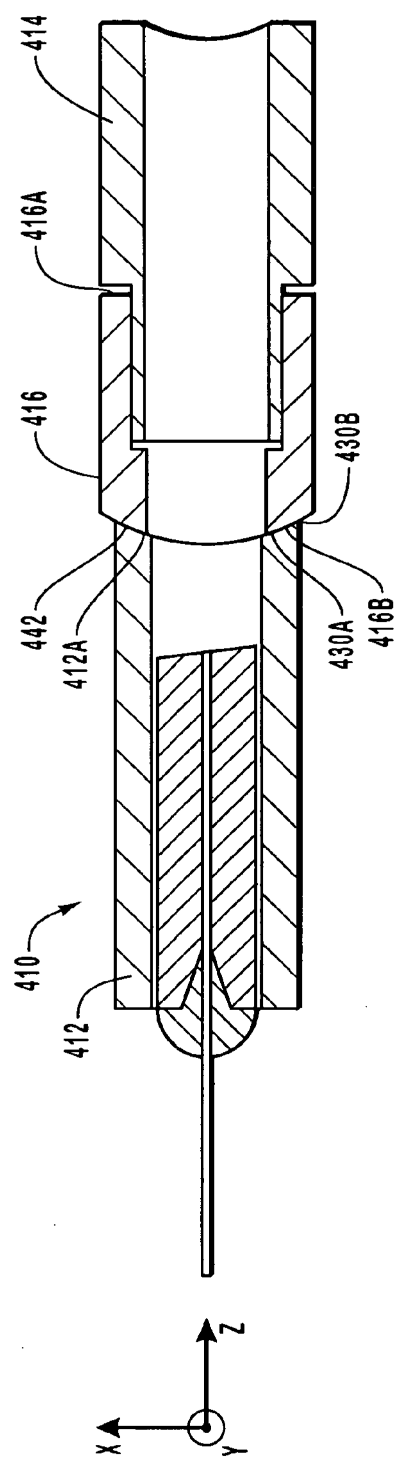
FIG. 4 is a cross sectional side view of an adjustable collimating device according to another embodiment of the present invention.

Reference is now made to FIG. 4 in describing various details regarding another embodiment of the present invention. It is appreciated that variations to the above embodiments can be realized while still remaining within the claims of the present invention. FIG. 4 depicts one such variation, wherein a collimator 410 is shown. The collimator 410 includes a collimating portion 412, a core portion 414, and an adapter portion 416. The collimating portion 412 is configured similarly to the collimating portion 12 of the embodiment shown in FIGS. 1A–1D, with the exception of a first engagement surface 430A at a first end 412A of the collimator portion. The first engagement surface 430A is concavely shaped about the annular collimating portion first end 412A, as opposed to being convexly shaped, as is the first end of the collimating portion in the embodiment shown in FIGS. 1A–1D.

Correspondingly, the adapter portion 416 includes a first end 416A, and a second end 416B having a convexly shaped second engagement surface 430B. So configured, the first and second engagement surfaces 430A and 430B form an adjustment point 442 that enables articular movement of the collimating portion 412 about the three axes X, Y, and Z with respect to the adapter portion 416, and hence the core portion 414, as in the embodiment of FIGS. 1A–1D. In this way, optical alignment can be adequately performed before the various collimator segments are bonded in a fixed position. Thus, it is shown that engagement surfaces between the collimating portion and the adapter portion can be configured in one of a variety of ways.

Figure 5:
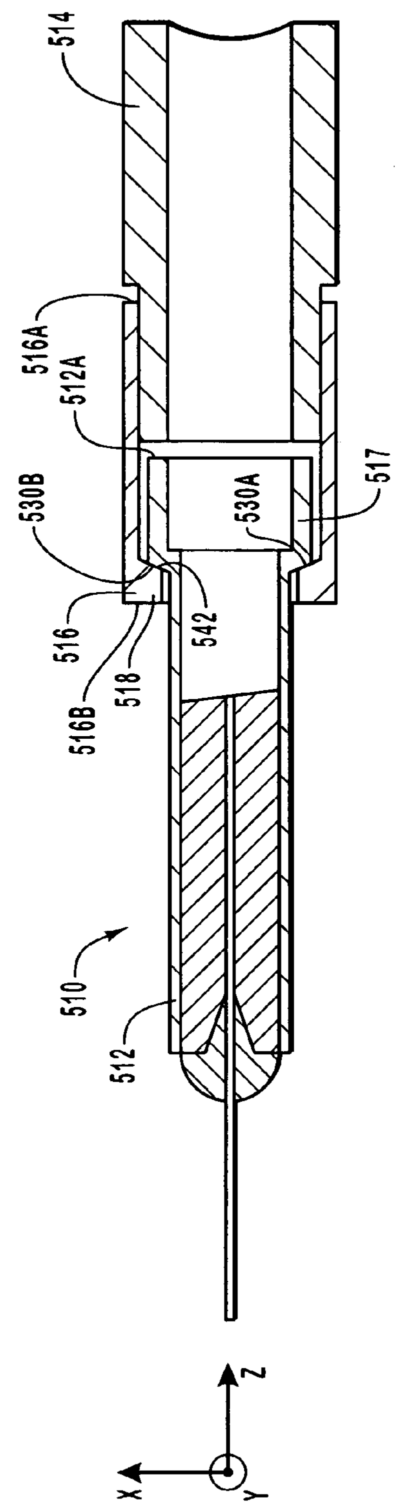
FIG. 5 is a cross sectional side view of an adjustable collimating device according to yet another embodiment of the present invention.

Reference is now made to FIG. 5 in describing various details regarding yet another embodiment of a collimator 510, according to the present invention. The collimator 510 includes a collimating portion 512, a core portion 514, and an adapter portion 516. In accordance with the present embodiment, the collimator 510 includes new structure that enables positioned adjustment to occur between the collimating portion 512 and the adapter portion 516, which results in adjustment between the collimating portion and the core portion 514. In detail, the collimating portion 512 includes an increased diameter portion 517 extending longitudinally inward a specified distance from a first end 512A thereof. The adapter portion 516 has a first end 516A and second end 516B, and correspondingly includes an annular lip 518 that extends axially inward from the second end.

The collimating portion 512 and adapter portion 516 of the present embodiment provide structure by which relative positional adjustment can be made between the collimating portion and the core portion 514. In particular, a longitudinally inward portion of the increased diameter portion 517 defines an annular first engagement surface 530A, while an interior portion of the lip 518 defines an annular second engagement surface 530B. The first and second engagement surfaces 530A and 530B movably engage one another to define an adjustment point 542 that allows for positional adjustment freedom in three X, Y, and Z-axes between the collimating portion 512 and the adapter portion 516 and, by extension, the core portion 514. As before, the adjustment point 542 can then be used as a bonding point for securing the respective positions of the collimating portion 512 and adapter portion 516. The design of the present embodiment can advantageously be used in situations where a relatively larger collimating lens is desired to be positioned at the collimating portion first end 512A.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical apparatus, comprising:

a collimating device including:

- a collimating portion that includes a collimating element optically coupled to an optical fiber, the collimating portion including a first engagement surface;
- a core portion; and
- an adapter portion that interconnects the collimating portion with the core portion, the adapter portion including a second engagement surface that movably engages with the first engagement surface of the collimating portion to enable relative motion of the core portion with respect to the collimating portion, wherein the adapter portion is coupled with the core portion via a tongue and slot configuration.

2. An optical apparatus as defined in claim 1, wherein the core portion contains an optical component selected from the group consisting of an optical filter, a birefringent crystal, a circulator, and an isolator.

3. An optical apparatus as defined in claim 2, wherein the collimating portion, the core portion, and the adapter portion each cooperate to define a longitudinal cavity, and wherein the collimating element, the optical fiber, and the optical component are positioned in the longitudinal cavity.

4. An optical apparatus as defined in claim 3, wherein the first and second engagement surfaces form articular surfaces that enable articular motion of the core portion with respect to the collimating portion.

5. An optical apparatus as defined in claim 4, wherein the relative motion of the core portion with respect to the collimating portion alters an optical path defined through the longitudinal cavity.

6. An optical apparatus as defined in claim 1, wherein the relative motion of the core portion includes linear movement along a longitudinally axial direction and articular movement about three orthogonal axes.

7. An optical apparatus as defined in claim 1, wherein the first engagement surface is convexly shaped, and wherein the second engagement surface is concavely shaped.

8. An optical apparatus as defined in claim 1, wherein the collimating portion, the core portion, and the adapter portion are bonded to one another after relative motion of the core portion with respect to the collimating portion is performed.

9. An optical apparatus as defined in claim 1, wherein the core portion comprises a portion of the first collimating device and a second collimating device.

10. A collimating device, comprising:

a collimating portion that defines a first longitudinal cavity segment extending between first and second ends, the first longitudinal cavity segment containing an optical fiber that is optically coupled to a collimating lens, wherein the collimating portion first end has a shaped first engagement surface;

a core portion that defines a second longitudinal cavity segment extending between first and second ends, the second longitudinal cavity segment containing an optical component, the core portion second end defining a tongue portion; and an adapter portion that defines a third longitudinal cavity segment extending between first and second ends and that interconnects the collimating portion with the core portion, wherein the adapter portion second end has a shaped second engagement surface that movably engages with the first engagement surface of the collimating portion to enable relative movement between the collimating portion and the core portion before the collimating portion is bonded to the adapter portion, and wherein the adapter portion first end defines a slot that engages the tongue portion of the core portion.

11. A collimating device as defined in claim 10, wherein the adapter portion is configured to enable the core portion to engage in linear axial movement in a longitudinal direction and articular movement about three orthogonal axes with respect to the collimating portion.

12. A collimating device as defined in claim 11, wherein the core portion second end is slidably engaged with the adapter portion first end to enable the linear axial movement in the longitudinal direction with respect to the collimating portion before the core portion is bonded to the adapter portion.

13. A collimating device as defined in claim 12, wherein the collimating portion is bonded to the adapter portion between the first and second engagement surfaces after relative movement is performed, and wherein the core portion second end is bonded to the adapter portion first end after relative movement is performed.

14. A collimating device as defined in claim 13, wherein the first engagement surface is annular and is convexly shaped, and wherein the second engagement surface is annular and is concavely shaped.

15. A collimating device as defined in claim 14, wherein a gap existing between the first and second engagement surfaces is minimized, and wherein a gap existing between the core portion second end and the adapter portion first end is minimized.

16. A collimating device as defined in claim 10, wherein the first engagement surface is annular and is concavely shaped, and wherein the second engagement surface is annular and is convexly shaped.

17. A collimating device, comprising:

a collimating portion that defines a first longitudinal cavity segment extending between first and second ends, the first longitudinal cavity segment containing an optical fiber that is optically coupled to a collimating lens, wherein the collimating portion first end has a shaped first engagement surface;

a core portion that defines a second longitudinal cavity segment extending between first and second ends, the second longitudinal cavity segment containing an optical component, wherein the core portion second end includes opposing flattened portions that define a tongue; and an adapter portion that defines a third longitudinal cavity segment extending between first and second ends and that interconnects the collimating portion with the core portion, wherein the adapter portion second end has a shaped second engagement surface that movably engages with the first engagement surface of the collimating portion, and wherein the adapter portion includes a slot extending inward from the adapter portion first end to engage the tongue of the core portion, the engagement surfaces and the slot and tongue enabling relative movement between the collimating portion and the core portion before the collimating portion is bonded to the adapter portion.

18. A collimating device as defined in claim 17, wherein engagement of the slot and the tongue enables the core portion to engage in linear axial movement in a longitudinal direction and linear movement in a transverse direction with respect to the collimating portion.

19. A collimating device as defined in claim 18, wherein the engagement of the first and second engagement surfaces enable the collimating portion to engage in articular movement about three orthogonal axes with respect to the core portion.

20. A collimating device as defined in claim 19, wherein the collimating portion is bonded to the adapter portion between the first and second engagement surfaces after relative movement is performed, and wherein the core portion is bonded to the adapter portion between the slot and the tongue after relative movement is performed.

21. A collimating device as defined in claim 20, wherein the first engagement surface is annular and is convexly shaped, and wherein the second engagement surface is annular and is concavely shaped.

22. A collimating device as defined in claim 21, wherein a gap existing between the first and second engagement surfaces is minimized, and wherein a gap existing between the tongue and the slot is minimized.

23. A collimating device, comprising:

a collimating portion that defines a first longitudinal cavity segment extending between first and second ends, the first longitudinal cavity segment containing an optical fiber that is optically coupled to a collimating lens, wherein the collimating portion first end includes opposing flattened portions that define a first tongue;

a core portion that defines a second longitudinal cavity segment extending between first and second ends, the second longitudinal cavity segment containing an optical component, wherein the core portion second end includes opposing flattened portions that define a second tongue;

a first adapter portion that defines a third longitudinal cavity segment extending between first and second ends, wherein the first adapter portion first end has a shaped first engagement surface, and wherein the first adapter portion second end defines a first slot extending longitudinally inward from the first adapter portion second end to engage the first tongue of the collimating portion; and a second adapter portion that defines a fourth longitudinal cavity segment extending between first and second ends and that interconnects the first adapter portion to the core portion, wherein the second adapter portion second end has a shaped second engagement surface that movably engages with the first engagement surface of the first adapter portion, and wherein the second adapter portion first end includes a second slot extending longitudinally inward from the second adapter portion first end to engage the second tongue of the core portion, wherein the engagement between the first and second engagement surfaces, the first slot and first tongue, and the second slot and second tongue enable relative movement between the collimating portion and the core portion before the collimating portion is bonded to first adapter portion and the core portion is bonded to the second adapter portion.

24. A collimating device as defined in claim 23, wherein engagement of the first slot and the first tongue enables the core portion to engage in linear axial movement in a longitudinal direction and linear movement in a first transverse direction with respect to the collimating portion.

25. A collimating device as defined in claim 24, wherein engagement of the second slot and the second tongue enables the core portion to engage in linear axial movement in a longitudinal direction and linear movement in a second transverse direction with respect to the collimating portion, the second transverse direction being orthogonal to the first transverse direction.

26. A collimating device as defined in claim 25, wherein the engagement of the first and second engagement surfaces enables the collimating portion to engage in articular movement about three orthogonal axes with respect to the core portion.

27. A collimating device as defined in claim 26, wherein the first engagement surface is annular and is convexly shaped, and wherein the second engagement surface is annular and is concavely shaped.

28. A collimating device as defined in claim 27, wherein a gap existing between the first and second engagement surfaces is minimized, wherein a gap existing between the first tongue and the first slot is minimized, and wherein a gap existing between the second tongue and the second slot is minimized.

29. A collimating device, comprising:

a collimating portion that defines a first longitudinal cavity segment extending between first and second ends, the first longitudinal cavity segment containing an optical fiber that is optically coupled to a collimating lens, the collimating portion first end including an increased diameter portion that defines an annular first engagement surface;

a core portion that defines a second longitudinal cavity segment extending between first and second ends, the second longitudinal cavity segment containing an optical component; and an adapter portion that defines a third longitudinal cavity segment extending between first and second ends and that interconnects the collimating portion with the core portion, wherein the adapter portion second end defines an annular lip that extends radially inward and that defines a second engagement surface that movably engages with the first engagement surface of the collimating portion, the first and second engagement surfaces enabling relative movement between the collimating portion and the core portion before the collimating portion is bonded to the adapter portion.

30. A collimating device as defined in claim 29, wherein the engagement of the first and second engagement surfaces enable the collimating portion to engage in articular movement about three orthogonal axes with respect to the core portion.

31. A collimating device as defined in claim 30, wherein the first end of the adapter portion engages the second end of the core portion, the core portion second end having a reduced diameter.

32. A collimating assembly as defined in claim 31, wherein the increased diameter portion of the collimating portion axially extends in a longitudinal direction a specified distance along the collimating portion toward the collimating portion second end.

33. A collimating device as defined in claim 32, wherein the first engagement surface is convexly shaped, and wherein the second engagement surface is concavely shaped.

* * * * *